United States Patent [19]

Easterle et al.

[11] Patent Number: 5,129,975
[45] Date of Patent: Jul. 14, 1992

[54] METHOD OF FILLING ELONGATED CHANNELS WITH RESIN FOAM

[75] Inventors: Mark A. Easterle, Rochester; Norman K. Merser, Columbiaville, both of Mich.

[73] Assignee: Foamseal, Inc., Oxford, Mich.

[21] Appl. No.: 434,755

[22] Filed: Nov. 13, 1989

[51] Int. Cl.⁵ .............................................. B32B 5/20
[52] U.S. Cl. ........................................ 156/77; 156/78; 156/79; 264/46.5; 264/46.6
[58] Field of Search ............................ 156/77, 78, 79; 264/46.5, 46.6

[56] References Cited

U.S. PATENT DOCUMENTS

| | | | |
|---|---|---|---|
| 3,007,208 | 11/1961 | Urban | 156/79 |
| 3,970,324 | 7/1976 | Howat | 156/78 |
| 5,021,108 | 6/1991 | Berquist | 264/46.5 |

FOREIGN PATENT DOCUMENTS

| | | | |
|---|---|---|---|
| 842267 | 5/1952 | Fed. Rep. of Germany | 264/46.5 |
| 10584 | 5/1979 | Japan | 264/46.5 |
| 42632 | 4/1981 | Japan | 264/46.5 |

*Primary Examiner*—Caleb Weston
*Attorney, Agent, or Firm*—Dykema Gossett

[57] ABSTRACT

A method of substantially completely filling elongated channels with foam, such as the channels in an extruded lineal used by the window industry. The method includes first orienting the channel in an upwardly angled orientation preferably greater than 30 degrees and less than 90 degrees, with a preferred angle of about 60 degrees. Where the channel has open ends, the lower end may be temporarily sealed. A thin, relatively high-pressure high-velocity stream of liquid foamable resin is then directed into the elongated channel open end generally parallel to the inside walls, such that the high-pressure liquid stream is carried at least partially down the length of the elongated channel, prior to contacting the channel inside walls and creaming. The liquid foamable resin then rises upwardly through the elongated channel, substantially completely filling the channel with resin foam.

12 Claims, 1 Drawing Sheet

U.S. Patent
July 14, 1992
5,129,975
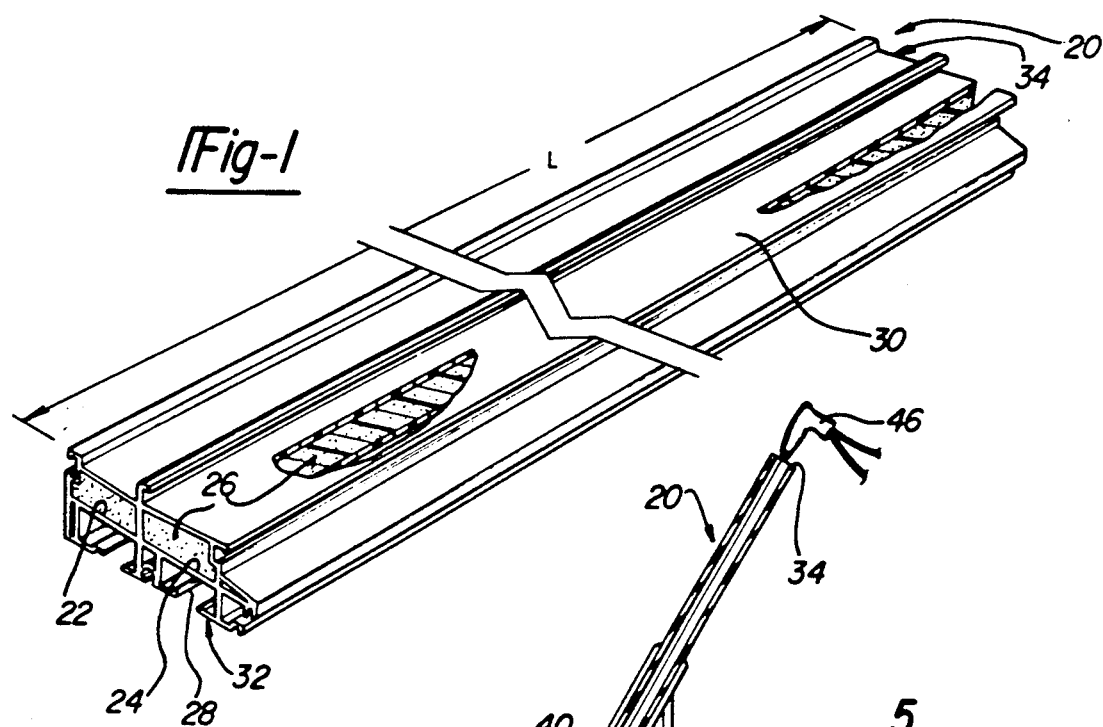
*Fig-1*
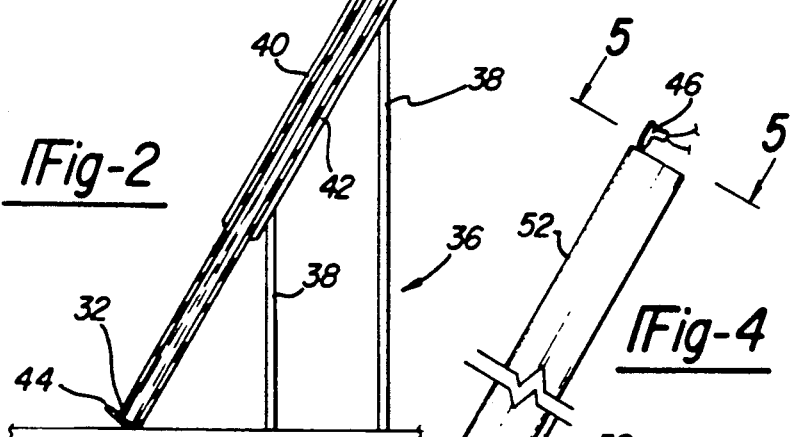
*Fig-2*
*Fig-4*
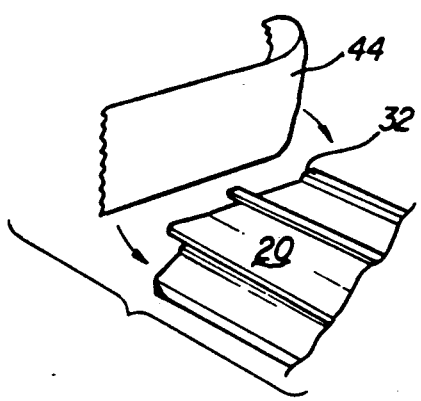
*Fig-3*
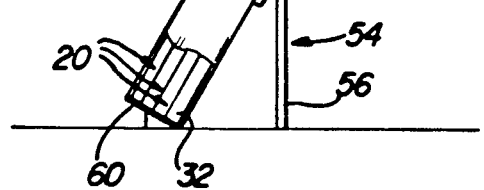
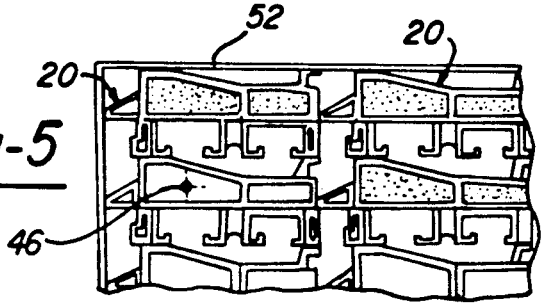
*Fig-5*

METHOD OF FILLING ELONGATED CHANNELS WITH RESIN FOAM

BACKGROUND OF THE INVENTION

Several structural applications require filling of relatively small cross-sectional area elongated channels with foam, preferably a multi-component foam, such as polyurethane. The purposes of the foam "core" includes, for example, providing a thermal barrier, sound attenuation, improved structural rigidity and impeding air infiltration. The method of this invention is particularly adapted to a commercial mass production method of substantially completely filling such elongated channels, while reducing labor costs.

The method of this invention will be described in relation to the filling of the channels of an extruded lineal, such as used by the window and sliding door industry. It will be understood, however, that the method of this invention is also suitable for many other applications which require filling of relatively small cross-sectional are elongated channels with resin foam. Extruded lineals used by the window industry, for example, are generally formed of polyvinyl chloride (PVC). The extruded lineals are commercially available in 14-foot lengths or longer and generally include two or more parallel channels. The channels to be filled have a cross-sectional area ranging from about 0.5 square inches to 2 square inches, or greaTer. The channels may be filled with a relatively rigid polyurethane foam to improve the structural rigidity of the relatively flexible PVC lineals, impede air infiltration and to provide a thermal barrier and reduce sound attenuation. It is generally difficult to use a pre-formed foam core because the shape of the channels may be complex, and the shape varies from channel to channel. Pre-formed or pre-cut foam cores have, however, been used in such applications, where the foam core is cut to the desired shape and then telescopically inserted into the channel.

The two presently preferred methods of filling the channels of an extruded lineal may result in substantial voids throughout the length of the channels, reducing the advantages of filling the channels with foam. The preferred foam for extruded lineals is a multi-component polyurethane foam, and the channels are filled with a spray or pour gun. Both methods require movement of either the application gun or the lineal, requiring two or three operators. In one method, for example, a conventional foam application gun, such as a Gusmer Model D spray gun or AR-250 pour gun, is fitted with a metal tubular extension having a length of about three feet or longer. The extension is inserted into one open end of the lineal channel, which is laid flat on a horizontal surface. The liquid foamable polyurethane is then poured into the channel. The channel is then moved away from the gun to fill one-half of the channel of the lineal with polyurethane foam. The process is then repeated from the opposite open end of the lineal, to fill the entire channel with polyurethane foam. As will be understood, this method requires two or three operators, and the lineal must be filled from both ends, resulting in substantial labor costs.

In a second commercial method, a polyurethane pour gun is fitted with a flexible hose which is inserted several feet into the lineal channel. The channel is supported on a horizontal surface. The hose is then withdrawn as the liquid polyurethane foam is poured into the lineal channel, allowing the filling of the lineal channel from one end. The rate of withdrawal of the hose must be accurately controlled, and one operator withdraws the hose as the second operator operates the pour gun. As described, both methods may result in substantial voids throughout the lineal channel or inconsistent filling, and both methods require at least two operators.

The need therefore remains for a method of efficiently filling an elongated channel, such as the channels of an elongated lineal, which eliminates or substantially eliminates voids and which preferably requires only one operator. In the method of the present invention, elongated channels, such as the channels of extruded lineals, may be filled with foam, including polyurethane foam, by one operator, substantially eliminating voids in the foam core. The elongated channel may be filled from one end and takes a few seconds to complete. The method of this invention does not require fixtures or gun extensions, such as a tube or probe, and the method is not very sensitive to operator control.

SUMMARY OF THE INVENTION

As described, the method of filling elongated channels of this invention requires only one operator and substantially eliminates the problem of voids. Thus, the resultant foam-filled channel provides the advantages sought by the application, including potential improvement in structural rigidity, particularly for relatively flexible channels, and other advantages, including sound attenuation. The foam core further impedes air infiltration and provides a thermal barrier.

The method of this invention first includes orienting the elongated channel in an upwardly angled orientation, preferably at an angle of greater than 30 degrees and less than 90 degrees relative to horizontal. The most preferable angle is about 60 degrees. Where the channel is open at both ends, such as the channels of an extruded lineal, the lower end of the channel is temporarily sealed, which may be accomplished by applying tape over the lower open end. Where the lineals are received in a cardboard box, for example, the lineals resting against the lower end of the box may be sufficient to temporarily seal the channels.

The method then includes directing a thin, relatively high-pressure high-velocity stream of liquid foamable resin into the open end of the elongated channel, preferably parallel to the inside walls of the channel. The high-pressure and high-velocity carries the liquid foamable resin stream at least partially down the length of the elongated channel, prior to contacting the inside walls of the channel, to prevent creaming of the liquid foam on the inside walls, blocking the filling of the channel. Inn the most preferred method of this invention, a predetermined volumetric "charge" of liquid foamable resin is injected into the channel, such that the channel will be completely filled. Finally, the liquid foam resin foams and rises upwardly through the elongated channel, completely filling the channel with resin foam.

In a typical application, the nozzle of a plural-component liquid foamable resin spray gun is inserted into the upper open end of the channel. The spray gun is oriented and adjusted to direct a thin high-pressure high-velocity stream of a foamable plural-component liquid resin, such as a polyurethane, into the channel, generally parallel to the channel inside walls. The liquid stream pressure is adjusted to carry the liquid stream substantially to the bottom of the channel to prevent foam blockage, as described. The polyurethane foam then rises through the channel, completely filling the channel and eliminating voids. Other advantages and meritorious features of the method of this invention will be more fully understood from the following detailed description of the preferred embodiments of the method of this invention, the drawings and the appended claims of the invention.

BRIEF DESCRIPTION OF THE DRAWINGS

FIG. 1 is an elevated perspective view of an extruded lineal filled with polymeric foam by the method of this invention;

FIG. 2 is a partially cross-sectional view of an extruded lineal supported at the most preferred angle being filled with polymeric foam illustrating the method of this invention;

FIG. 3 is a partial side perspective view of one end of the lineal illustrating a method of temxporarily sealing the channels of the lineal;

FIG. 4 is a partial side view of a container of extruded lineals of the type shown in FIG. 1 supported for the method of filling elongated channels with foam of this invention; and FIG. 5 is an end view of the container of extruded lineals shown in FIG. 4, in the direction of view arrows 5—5.

DESCRIPTION OF THE PREFERRED EMBODIMENTS OF THE METHOD OF THIS INVENTION

As described, the method of filling elongated channels with foam of this invention is particularly adapted to filling relatively small cross-sectional area elongated cchannels with foam, including plural-component foams, such as polyurethane. The method of this invention will now be described in relation to the filling of the channels of an extruded lineal, such as used by the prefabricated window industry. It will be understood, however, that the method of this invention is not limited to this particular application, but may be used in many applications requiring the filling of elongated channels, particularly channels having a relatively small cross-sectional area and where the cross-sectional shape of the channel is complex or varies from channel-to-channel. In such applications, it may be impractical to use a prefabricated foam core.

FIG. 1 illustrates a typical extruded polyvinyl chloride lineal 20, such as used by the prefabricated window and sliding door industry. The length L of the extruded lineal is relatively long, compared to its width. Extruded lineals of this general type are available in 14-foot and greater lengths, such that PVC extruded lineal are relatively flexible. It is preferred by the window manufacturers that the internal channels 22 and 24 are filled with a polyurethane foam having a density ranging from about 0.5 pcf to 3.0 pcf or greater. The foam core impedes air infiltration into the channels and provides a thermal and sound attenuation barrier. Where a relatively rigid foam is used (e.g. 3.0 pcf or greater), the foam core also substantially improves the structural rigidity of the extruded lineal. Although prefabricated foam cores have been used, this method of filling the channels with a foam core is generally impractical because the shape of the channels may be relatively complex, as shown, and the extruded lineala may have several channels to be filled with foam. An extruded lineal 20 having two channels 22 and 24 to be filled with foam 26 is illustrated in the drawings of this application to describe the method of this invention.

The disclosed extruded lineal 20 also includes open channels 28 at the "top" of the extruded lineal, which receives the glass or "lites" of an insulated window. The bottom surface 30 is configured to support the window in the casing. The channels 22 and 24 in an extruded lineal are open at both ends 32 and 34. After filling the channels with foam, the extruded lineals are cut to length by the window manufacturer, depending upon the size of the window.

In the method of this invention, the extruded lineal 20 is oriented in an upwardly angled orientation, as shown in FIG. 2. Where the extruded lineal 20 is relatively long and flexible, the lineal is preferably supported in an upwardly angled orientation by a suitable support fixture 36. In the disclosed embodiment, the support fixture 36 includes generally vertical legs or braces 38 and top and bottom panels 40 and 42, respectively, which support a suitable portion of the extruded lineal 20. The support fixture may be formed of any suitable material, including wood.

The lower end 32 of the extruded lineal is preferably temporarily sealed during filling. In the disclosed embodiment, the lower end 32 of the extruded lineal is sealed with tape 44, as shown in FIG. 3. The tape 44 is simply applied over the lower end 32 of the channels 22 and 24, temporarily sealing the channels during filling of the channels with foam. The lower ends of the channels may also be plugged or sealed by any other suitable means. It will be understood, however, that the "seal" may be a relatively low-pressure seal because of the method described, and the escape of a small volume of foam through the lower end should not cause a problem.

In the method of this invention, a liquid foamable resin is introduced into the upper end 34 of the extruded lineal in the form of a thin, relatively high-pressure high-velocity stream which carries the liquid stream substantially down the length of the elongated lineal, prior to contacting the inside walls of the channel and creaming. In the disclosed embodiment, the liquid stream is generated by a conventional dispensing gun 46. The gun is oriented and adjusted to direct a thin, high-pressure stream of a foamable plural-component liquid resin into one of the channels 22 or 24 of the extruded lineal 20, as shown in FIG. 2. The nozzle of the dispensing gun is introduced into the open end 34 of the extruded lineal and triggered, directing a thin, relatively high-pressure stream of liquid foamable resin into the channel, generally parallel to the side walls of the channel and preferably coincident with the longitudinal axis of the channel. In the preferred method of this invention, a predetermined volumetric "charge" of liquid foamable resin is introduced into each channel to substantially completely fill the channel with foam. The appropriate charge may be determined by trial and error, or the volume may be calculated for each channel configuration.

As will be understood by those skilled in the art, even a relatively thin, high-pressure stream of liquid foamable resin generated by a conventional dispensing gun will expand with distance. In a 14-foot length, for example, a relatively thin-diameter stream (e.g. 0.070 in.) will expand to a diameter greater than the cross-sectional area of a small cross-sectional channel. It is a feature of the method of this invention, however, that the diameter of the stream and line pressure are adjusted to carry the stream downwardly through the channel a substantial distance prior to contacting the inside walls of the channel and "creaming," thereby avoiding blocking of the flow of liquid foamable resin through the channel. In the preferred method of this invention, the liquid stream reaches the bottom of the channel prior to closure of the channel with foam, although the liquid stream may contact the inside walls of the channel above the bottom 32 of the channel.

It has been found that the most preferred angle of the channel to be filled, relative to horizontal, for the method of this invention is generally about 60 degrees, with a variance of about 10 degrees. This angle assures complete filling and limits voids in the foam core in most applications of the type described. As will be understood, the combined viscosity of the liquid foamable resin, temperature, pressure and diameter of the stream must be selected to assure that the liquid foamable resin reaches the bottom or near the bottom of the channel to form a void-free foam core which completely fills the channel. A slow reacting foamable resin is preferred for most applications, particularly where the cross-sectional area of the channel is small compared to the length. Smaller angles to about 30 degrees may be used, particularly where the cross-sectional area of the channel is greater and larger angles, preferably less than 90 degrees, may also be used depending upon the application and operating conditions. It has been found that an angle of 90 degrees relative to horizontal with a channel having a small cross-sectional area results in voids which are not found at 70 degrees, for example. The foam composition will generally be dictated by the application and customer requirements. The preferred angle of generally about 60 degrees relative to horizontal was, however, found to be particularly suitable for a relatively slow reacting polyurethane foam at the operating conditions described herein.

The liquid foamable resin then "blows" and rises upwardly through the elongated channel, filling the channel with resin foam. The opening through the upper end 34 of the channel may be gated to optimize back pressure of foam blow, and the foam is allowed to rise, filling the channel to the upper opening or entry port. The entry port remains partially open to allow the venting of pressure as the foam rises up the channel. The channels of the lineals are filled individually or in groups, as shown in FIGS. 4 and 5. Extruded lineals are typically received packed in a container, such as the cardboard box 52 shown in FIGS. 4 and 5. The extruded lineals 20 are tightly packed in the box 52 in parallel relation to save shipping costs. The method of this invention may be utilized to fill the channels of the extruded lineals without removing the lineals from the shipping container 52, as now described. The shipping container is first supported at the desired angle on a support fixture 54 having a leg 56 and a support 58, which is angled relative to the support 56 at the desired angle. The nozzle of the application gun 46 is then introduced into the open end of a channel of one of the lineals and triggered to direct a thin, relatively high-pressure stream of liquid foamable resin into the elongated channel, parallel to the side walls of the channel, as described.

In the preferred method, a predetermined volumetric charge of liquid foamable resin is introduced into each of the channels, depending upon the volume, such that the operator can fill the next channel prior to completion of the rise of the foam through the last channel, thereby reducing the time required to fill the channels. In a typical application, wherein the method of this invention is utilized to fill the channels of extruded lineals of the type disclosed, the charge of liquid foamable resin is completed in about two seconds or less. The foam then blows and rises through the channel, filling the channel, in about five seconds or less. Thus, the method of this invention is very efficient, requiring only one operator. Further, in the method disclosed in FIGS. 4 and 5, it is not necessary to temporarily seal the lower ends of the channels of the exruded lineals because the pressure of the lineals against the lower end 60 of the shipping container 52 is sufficient to prevent substantial escape of the foam.

As will be understood, the diameter of the high-pressure stream will be dependent upon the cross-sectional area and length of the channels to be filled. In a typical application, wherein the method of this invention is utilized to fill the channels of extruded lineals of the type disclosed, the cross-sectional areas of the channels will range from about 0.5 square inches or smaller to 2 square inches or greater. A high-pressure high-velocity stream having a diameter of about 0.070 inches has been found suitable for most applications of this type. Further, the preferred pressure of the stream will also be dependent upon the length of the channels to be filled. A hydraulic line pressure for a conventional application gun of 400 to 500 psi has been found suitable for this application. As described above, a polyurethane foam having a density of about 0.5 pcf to 3.0 pcf is preferred by the prefabricated window industry. The processing temperature is typically in the range of 70° to 100° F., preferably about 85° F., and may be fixed by the temperature control equipment in a conventional application gun. Further, the predetermined "charge" of liquid foamable resin may be fixed by the volumetric dispensing equipment on the machine. The preferred volumetric charge is dependent upon the internal volume of the channel and the specified in situ density of the foam.

Suitable application guns useful for the method of this invention are available from Gusmer Corporation, including the Model D-Gun or the GX 7 Gun. The gun is adjusted to form a thin, relatively high-pressure, high-velocity stream of liquid foamable resin. Of course, the combined density of the liquid foamable resin will also affect the generation of the stream and the preferred resin foam will depend upon the particular application for the foam-filled channel. As described, the density of the foam core may range from a relatively flexible open-cell foam having a density of about 0.5 pcf to a more rigid closed-cell foam having a density of 3.0 pcf or greater. The greater density foams will add structural rigidity to the extruded lineal. The process of this invention may, however, accommodate many applications. A thin, relatively high-pressure, high-velocity stream may be generated, for example, with liquid polyurethane foamable resins having a combined density of 300 to 1000 cps at operating temperatures of 85° to 100° F. A relatively slow reacting foamable resin is, however, preferred to avoid blocking the channel where the resin contacts the inside walls above the lower end of the lineal. Thus, the method of this invention is not limited to any specific foam or foam formulation.

Further, the method of this invention is not very sensitive to the skill of the applicator. For example, the dispensing gun 46 may be hand-held, without fixtures, wherein the nozzle of the gun is oriented to direct the stream of liquid foamable resin generally coincident with the axis of the channel in the extruded lineal. This method has resulted in the filling of the channels of extruded lineals having lengths of 14 feet and greater. Further, the foam cores in the extruded lineals filled by the method of this invention have been found to be substantially free of voids, contrary to the prior art methods described above. The method of this invention therefore provides several important advantages over the prior art. First, as described above, the extruded lineals may be filled with only operator, reducing labor costs. Second, the method of this invention does not require relatively movement of the dispensing gun and the lineal, resulting in a simpler, more efficient method. Third, the method of this invention substantially reduces voids in the foam core, which is a primary object of the invention. Fourth, the method of this invention takes substantially less time to complete than the prior art methods. Finally, the method of this invention permits the application of a wider range of foam compositions and is less sensitive to operator skill. As will be understood, a relatively simple fixture may be utilized to fill several channels at a time because there is no relative movement between the dispensing gun and the lineal. The method of this invention therefore fulfills the objects of the invention, as described above.

We claim:

1. A method of substantially completely filling an elongated channel with a polymeric resin foam, said elongated channel having opposed inside walls defining a cross-sectional area of less than about two square inches and at least one open end, said method comprising:
   (a) orienting said elongated channel in an upwardly angled orientation of less than 90 degrees relative to horizontal with said open end at the upper end of said channel;
   (b) injecting a thin diameter, relatively high-pressure, high-velocity stream of liquid foamable resin in a predetermined volume charge into said elongated channel open end generally parallel to said channel inside walls, said high-pressure high-velocity liquid stream carrying said liquid foamable resin a substantial distance down the length of said elongated channel prior to contacting said channel inside walls and creaming thereby avoiding blockage of said channel as foam rises through said channel; and
   (c) allowing said liquid foamable resin to foam and rise upwardly through said elongated channel, substantially completely filling said channel with said polymeric resin foam with one injection of said foamable resin from one end of said channel.

2. The method of substantially completely filling an elongated channel with polymeric resin foam as defined in claim 1, wherein said method includes orienting said elongated channel at an angle greater than 30 degrees relative to horizontal.

3. The method of substantially completely filling an elongated channel with polymeric resin foam as defined in claim 1, wherein said method includes orienting said elongated channel at an angle of generally about 60 degrees relative to horizontal.

4. The method of substantially completely filling an elongated channel with polymeric resin foam as defined in claim 1, wherein said method includes orienting said elongated channel at an angle greater than 30 degrees relative to horizontal and injecting said thin stream of liquid foamable resin at a pressure of greater than about 400 psi.

5. The method of substantially completely filling an elongated channel with polymeric resin foam as defined in claim 1, wherein said elongated channel has an open end at both ends of said channel, said method then including temporarily sealing one of said open ends, then orienting said elongated channel in an upwardly angled orientation with the remaining open end at the upper end of said channel, as defined.

6. The method of substantially completely filling an elongated channel with polymeric resin foam as defined in claim 5, wherein said one channel open end is temporarily sealed by applying tape over said open end.

7. The method of substantially completely filling an elongated channel with polymeric resin foam as defined in claim 1, wherein said method includes filling a plurality of generally parallel channels in a structural member, said method including directing a predetermined volume of said liquid foamable resin into one of said channels, as defined, then directing a predetermined volume of said liquid foamable resin into a second of said channels, prior to the foamable resin in said first channel rising and filling said first channel with polymeric resin foam.

8. A method of substantially completely filling an elongated channel with a plural-component foam resin, said elongated channel having opposed inside walls defining a small cross-sectional area and at least one open end, said method comprising:
   (a) supporting said elongated channel in an upwardly angled orientation of greater than about 30 degrees and less than 90 degrees relative to horizontal, with said open end at the top of said channel;
   (b) injecting a thin diameter relatively high-pressure high-velocity stream of liquid foamable plural-component resin in a predetermined volume charge into said elongated channel open end generally coincident with the axis of said channel opposed inside walls, said high-pressure high-velocity sufficient to carry said thin diameter stream of liquid foamable resin a substantial distance through said channel prior to contacting said channel inside walls and creaming thereby avoiding blocking of the flow of foam through said channel; and
   (c) allowing said liquid foamable resin to foam and rise upwardly through said elongated channel, substantially completely filling said channel with resin foam with one injection of said liquid foamable resin from one end of said channel.

9. The method of substantially completely filling an elongated channel with foam resin as defined in claim 8, wherein said elongated channel has an open end at both ends of said channel, said method including temporarily sealing one of said open ends, then orienting said elongated channel in said upwardly angled orientation with said open end at the top of said channel, as defined.

10. The method of substantially completely filling an elongated channel with foam resin as defined in claim 9, wherein said channel open end is temporarily sealed by applying tape over said open end.

11. The method of substantially completely filling an elongated channel with foam resin as defined in claim 8, wherein said liquid foamable resin is injected into said channel at a pressure of greater than about 400 psi and said thin high-pressure high-velocity stream contacts said channel inside walls below the mid-portion of said channel and said foamable resin foams and rises upwardly and downwardly through said elongated channel, substantially completely filling said channel with foam resin.

12. A method of substantially completely filling an elongated channel with a polymeric plural-component resin foam, said elongated channel having opposed inside walls defining a small cross-sectional area substantially throughout the length of said channel and at least one open end, said method comprising:
 (a) orienting said elongated channel in an upwardly angled orientation of less than 90 degrees relative to horizontal with said open end at the upper end of said channel;
 (b) intorducing the nozzle of a plural-component liquid foamable resin spray gun into said elongated channel open end, orienting and adjusting said gun to direct a thin high-pressure high-velocity stream of a foamable plural-component liquid resin in a predetermined volume into said channel generally parallel to said channel inside walls, the small diameter of said liquid stream, velocity and pressure sufficient to carry said liquid stream into said channel a substantial distance through said channel sufficient to prevent foam blockage prior to said foam rising through said channel; and
 (c) allowing said plural-component liquid foamable resin to foam and rise upwardly through said channel, substantially completely filling said channel with polymeric resin foam with one injection of said foamable resin, from one end of said channel.

* * * * *

UNITED STATES PATENT AND TRADEMARK OFFICE
CERTIFICATE OF CORRECTION

PATENT NO. : 5,129,975
DATED : July 14, 1992
INVENTOR(S) : Mark A. Easterle & Norman K. Merser It is certified that error appears in the above-indentified patent and that said Letters Patent is hereby corrected as shown below:

In columne 1, line 29, "greaTer" should read "greater".

In column 2, line 53, "Inn" should read "In".

In column 3, line 19, "temxporarily" should read "temporarily".

Signed and Sealed this

Nineteenth Day of October, 1993

Attest:

BRUCE LEHMAN

*Attesting Officer*    *Commissioner of Patents and Trademarks*